US010788131B2

(12) United States Patent
Miller et al.

(10) Patent No.: US 10,788,131 B2
(45) Date of Patent: Sep. 29, 2020

(54) FACE SEAL ARRANGEMENT (71) Applicant: UNITED TECHNOLOGIES CORPORATION, Farmington, CT (US)

(72) Inventors: Jonathan L. Miller, Ware, MA (US); Colin D. Craig, West Hartford, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 0 days.

(21) Appl. No.: 15/666,136

(22) Filed: Aug. 1, 2017

(65) Prior Publication Data

US 2019/0040957 A1 Feb. 7, 2019

(51) Int. Cl.
*F01D 11/00* (2006.01)
*F16J 15/34* (2006.01)
*F16J 15/16* (2006.01)
*F16J 15/3248* (2016.01)
*F01D 25/18* (2006.01)

(52) U.S. Cl.
CPC ......... *F16J 15/3452* (2013.01); *F01D 11/003* (2013.01); *F01D 25/183* (2013.01); *F16J 15/162* (2013.01); *F16J 15/3248* (2013.01); *F05D 2220/32* (2013.01); *F05D 2240/50* (2013.01); *F05D 2240/58* (2013.01); *F05D 2240/60* (2013.01); *F05D 2260/38* (2013.01); *F05D 2300/224* (2013.01)

(58) Field of Classification Search
CPC .. F16J 15/02; F16J 15/062; F16J 15/06; F16J 15/08; F16J 15/0887; F16J 15/0818; F16J 15/3452; C23F 1/02; F01D 11/003; F02C 7/28; F04D 29/122; F05D 2220/32; F05D 2240/60
See application file for complete search history.

(56) References Cited

U.S. PATENT DOCUMENTS

| 3,025,115 | A | * | 3/1962 | Shevchenko | F01D 11/003 |
| | | | | | 184/6.26 |
| 4,063,741 | A | * | 12/1977 | Kerr | F16J 15/36 |
| | | | | | 277/373 |
| 4,377,290 | A | * | 3/1983 | Netzel | F16J 15/3484 |
| | | | | | 277/368 |

(Continued)

OTHER PUBLICATIONS

European Patent Office, European Search Report dated Nov. 15, 2018 in Application No. 18184763.3-1015.

(Continued)

*Primary Examiner* — Eugene G Byrd
(74) *Attorney, Agent, or Firm* — Snell & Wilmer L.L.P.

(57) ABSTRACT

A carbon seal assembly may comprise a seal support, a seal housing coupled to the seal support, and a carbon seal adjacent an aft portion of the seal housing. The carbon seal may comprise a nose defined by an axial surface of the carbon seal, a first radial surface of the carbon seal, and a second radial surface of the carbon seal radially inward of the first radial surface. The first radial surface and the second radial surface may extend forward from the axial surface. A first axial length of the first radial surface may be greater than a second axial length of the second radial surface.

19 Claims, 5 Drawing Sheets

(56) References Cited

U.S. PATENT DOCUMENTS

| | | | | |
|---|---|---|---|---|
| 4,406,459 | A * | 9/1983 | Davis | F16J 15/3404 |
| | | | | 277/401 |
| 4,453,722 | A | 6/1984 | Swanson | |
| 4,768,790 | A * | 9/1988 | Netzel | F16J 15/3464 |
| | | | | 277/377 |
| 4,795,572 | A * | 1/1989 | LaValley | B01D 33/067 |
| | | | | 210/784 |
| 5,464,227 | A * | 11/1995 | Olson | F16J 15/3404 |
| | | | | 277/400 |
| 5,863,047 | A * | 1/1999 | Ellis | F16J 15/3452 |
| | | | | 277/374 |
| 6,196,790 | B1 * | 3/2001 | Sheridan | F01D 11/003 |
| | | | | 415/111 |
| 7,984,911 | B2 * | 7/2011 | Dobek | F16J 15/3468 |
| | | | | 277/399 |
| 8,608,175 | B2 * | 12/2013 | Miller | F01D 11/00 |
| | | | | 277/373 |
| 9,546,560 | B2 * | 1/2017 | Larson | F01D 11/003 |
| 2007/0108704 | A1 * | 5/2007 | Craig | F01D 11/003 |
| | | | | 277/370 |
| 2009/0121441 | A1 * | 5/2009 | Miller | F01D 11/003 |
| | | | | 277/366 |
| 2010/0201074 | A1 * | 8/2010 | Haynes | F16J 15/441 |
| | | | | 277/361 |
| 2014/0140824 | A1 | 5/2014 | Sheridan | |
| 2016/0010477 | A1 * | 1/2016 | Maret | F16J 15/3404 |
| | | | | 277/408 |
| 2016/0333711 | A1 * | 11/2016 | Miller | F02C 7/28 |

OTHER PUBLICATIONS

European Patent Office, European Office Action dated Aug. 26, 2019 in Application No. 18184763.3.

* cited by examiner

FACE SEAL ARRANGEMENT

FIELD

The present disclosure relates to seals and, more particularly, to seals for a main shaft bearing compartment of a gas turbine engine.

BACKGROUND

Seal assembly failure may occur when a surface or "sealing face" of a seal begins to wear, which can lead to axial translation of the seal assembly. The wearing of the sealing face coupled with seal assembly translation may cause the springs of the seal assembly to lengthen. As the wearing of the sealing face progresses and spring lengthening continues, a biasing load of the springs may be reduced, which may allow the seal assembly to disengage or separate from the seal seat interfacing, which can lead to increased engine system risk and damage to surrounding hardware.

SUMMARY

A carbon seal assembly is disclosed according to various embodiments. A carbon seal assembly may comprise a seal support, a seal housing coupled to the seal support, and a carbon seal adjacent an aft portion of the seal housing. The carbon seal may comprise a nose defined, at least partially, by an axial surface of the carbon seal, a first radial surface of the carbon seal, and a second radial surface of the carbon seal radially inward of the first radial surface. The first radial surface and the second radial surface may extend forward from the axial surface. A first axial length of the first radial surface may be greater than a second axial length of the second radial surface.

In various embodiments, a spring may extend between the seal support and a flange extending radially from the seal housing. A fastener may extend through an aperture defined by the flange. A distance between the flange and a cap of the fastener is less than the first axial length and greater than the second axial length. The cap of the fastener may limit an axial translation of the seal housing. A piston ring may be disposed in a groove defined by a forward portion of the seal housing. The seal housing may comprise a central portion extending between the aft portion of the seal housing and the forward portion of the seal housing. An inner diameter surface of the carbon seal may be radially outward of a surface of the central portion of the seal housing.

A main shaft bearing compartment seal system of a gas turbine engine is disclosed according to various embodiments. A main shaft bearing compartment seal system of a gas turbine engine may comprise a shaft, a seal seat coupled to the shaft, and a carbon seal assembly disposed radially outward of the shaft. The carbon seal assembly may comprise a seal support, a seal housing coupled to the seal support, and a carbon seal attached to the seal housing. The carbon seal may comprise a nose defined, at least partially, by an axial surface of the carbon seal, a first radial surface of the carbon seal, and a second radial surface of the carbon seal radially inward of the first radial surface. The first radial surface and the second radial surface may extend from the axial surface. A first length of the first radial surface may be greater than a second length of the second radial surface.

In various embodiments, a spring may extend between the seal support and a flange extending radially outward from the seal housing. The spring may bias the seal housing and the carbon seal toward the seal seat. A fastener may extend through an aperture defined by a flange extending radially outward from the seal housing. A cap may be coupled to the fastener. The cap may be located aft of the flange. A distance between the flange and the cap may be less than the first length and greater than the second length. The cap of the fastener may limit an axial translation of the seal housing. The seal seat may rotate about an axis of the gas turbine engine, and the seal housing may prevent the carbon seal from rotating about the axis of the gas turbine engine. A hard coat may be disposed on a surface of the seal seat. The hard coat may extend radially inward past the second radial surface of the carbon seal. A piston ring may be disposed in a groove defined by the seal housing.

A seal assembly is disclosed according to various embodiments. A seal assembly may comprise a seal housing and a seal attached to the seal housing. The seal may comprise a nose defined, at least partially, by a first surface of the seal, a second surface of the seal, and a third surface of the seal. The second surface and the third surface extend from the first surface. A first length of the second surface may be greater than a second length of the third surface.

In various embodiments, a fastener may extend through an aperture defined by the seal housing. A cap may be coupled to the fastener. A distance between the cap and the aperture may be less than the first length and greater than the second length. A piston ring may be disposed in a groove defined by the seal housing.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Throughout the present disclosure, like reference numbers denote like elements. Accordingly, elements with like element numbering may be shown in the figures, but may not necessarily be repeated herein for the sake of clarity.

As used herein, "aft" refers to the direction associated with the tail (i.e., the back end) of an aircraft, or generally, to the direction of exhaust of the gas turbine. As used herein, "forward" refers to the direction associated with the nose (i.e., the front end) of an aircraft, or generally, to the direction of flight or motion. As used herein, "distal" refers to the direction radially outward, or generally, away from the axis of rotation of a turbine engine. As used herein, "proximal" refers to a direction radially inward, or generally, towards the axis of rotation of a turbine engine.

Figure 1:
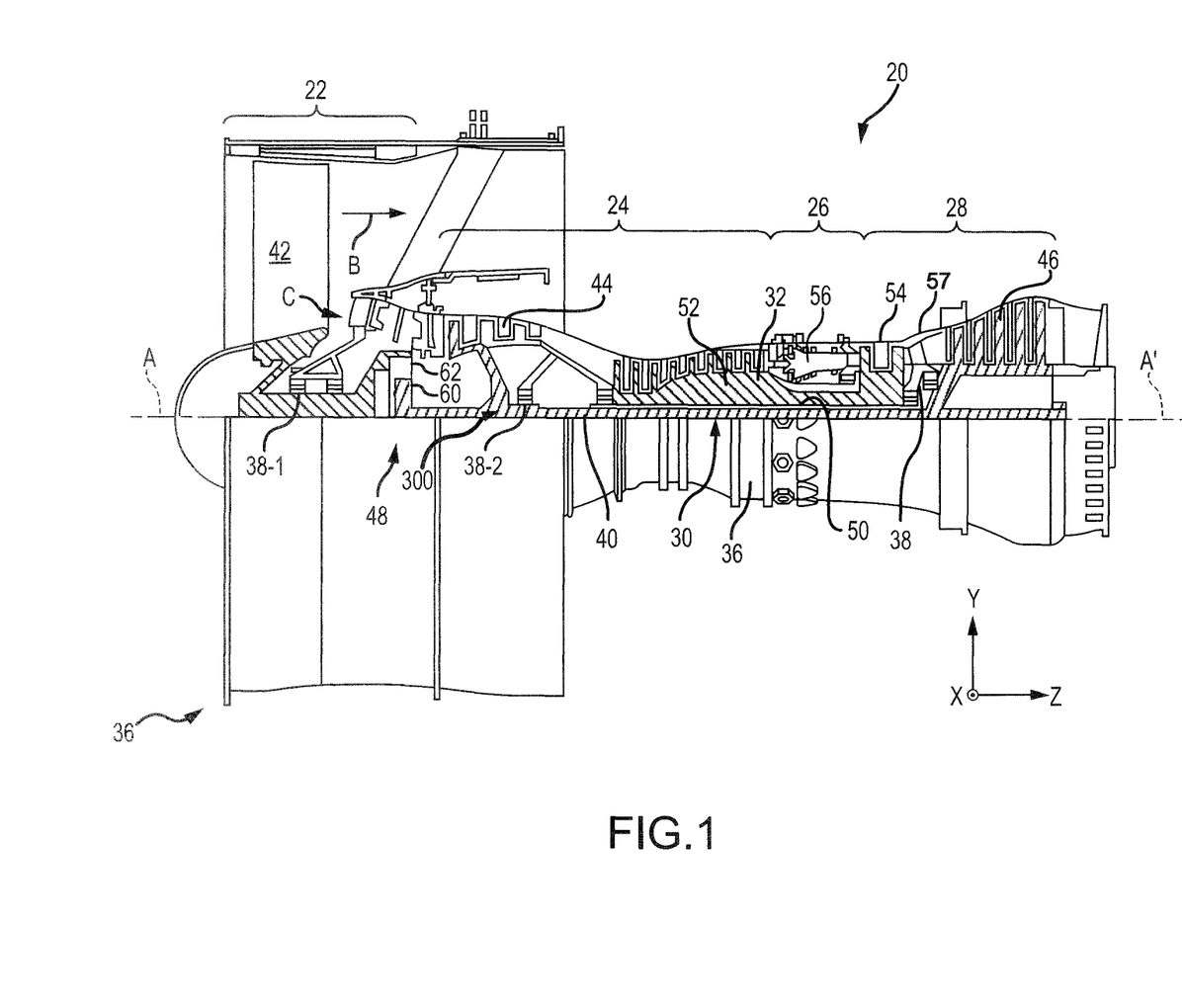
FIG. 1 illustrates a cross-sectional view of a gas turbine engine, in accordance with various embodiments.

With reference to FIG. 1, a gas turbine engine 20 is shown according to various embodiments. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive fluid (e.g., air) along a path of bypass airflow B while compressor section 24 can drive fluid along a core flowpath C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis A-A' relative to an engine static structure 36 (also referred to as an engine casing structure) via several bearing systems 38, 38-1, and 38-2. Engine central longitudinal axis A-A' is oriented in the z direction on the provided xyz axes. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44, and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54. As used herein, a "high pressure" compressor or turbine experiences a higher pressure than a corresponding "low pressure" compressor or turbine.

A combustor 56 may be located between high pressure compressor 52 and high pressure turbine 54. A mid-turbine frame 57 of engine casing structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion. The gas turbine engine 20 may be, for example, a high-bypass ratio geared engine. In various embodiments, the bypass ratio of the gas turbine engine 20 may be greater than about six (6). In various embodiments, the bypass ratio of the gas turbine engine 20 may be greater than ten (10). In various embodiments, the geared architecture 48 may be an epicyclic gear train, such as a star gear system (sun gear in meshing engagement with a plurality of star gears supported by a carrier and in meshing engagement with a ring gear) or other gear system. The geared architecture 48 may have a gear reduction ratio of greater than about 2.3 and the low pressure turbine 46 may have a pressure ratio that is greater than about five (5). In various embodiments, the bypass ratio of the gas turbine engine 20 is greater than about ten (10:1). In various embodiments, the diameter of the fan 42 may be significantly larger than that of the low pressure compressor 44, and the low pressure turbine 46 may have a pressure ratio that is greater than about five (5:1). The low pressure turbine 46 pressure ratio may be measured prior to the inlet of the low pressure turbine 46 as related to the pressure at the outlet of the low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared engine, such as a geared turbofan, or non-geared engine, such as a turbofan, a turboshaft, or may comprise any gas turbine engine as desired.

Figure 2A:
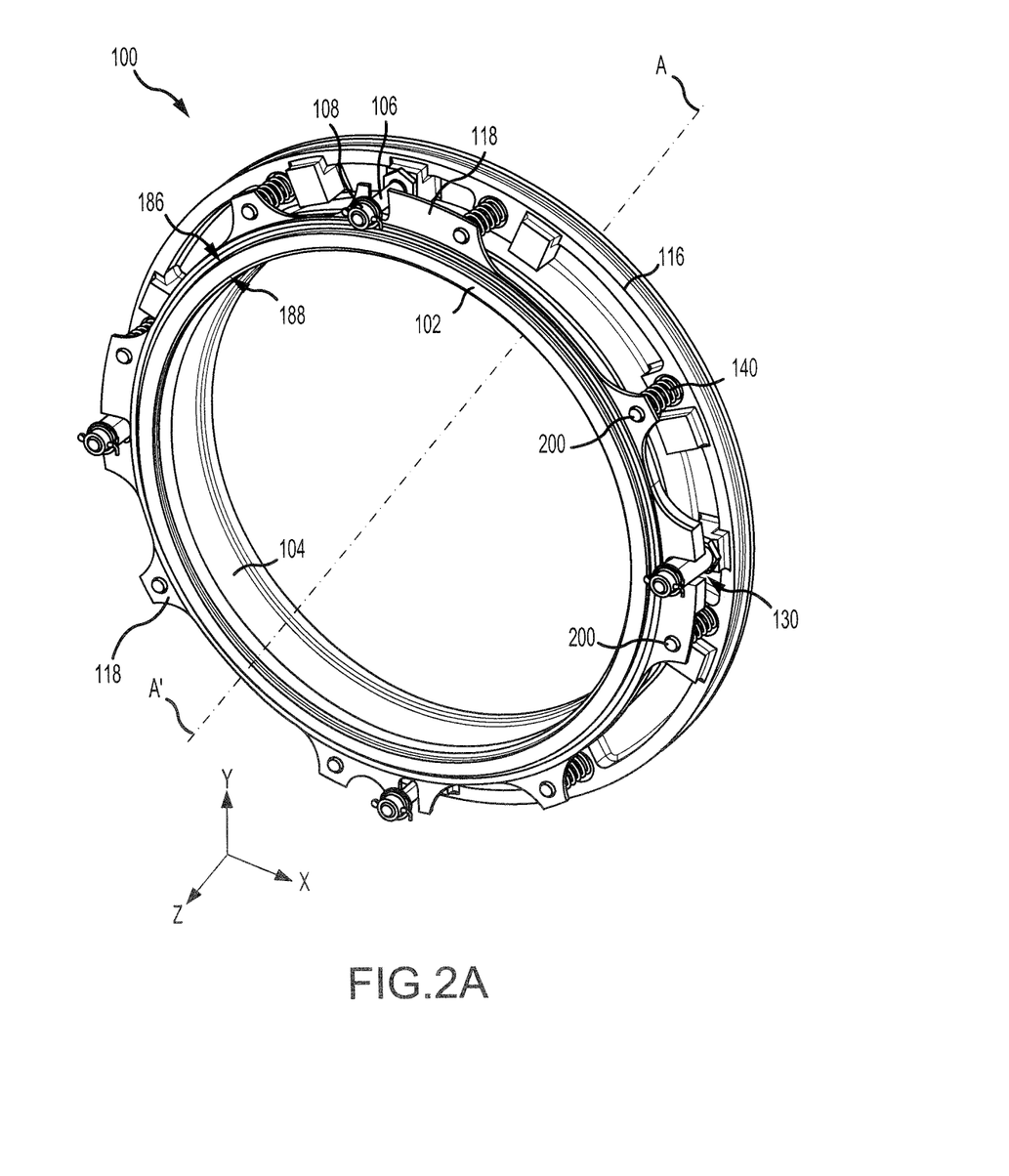
FIG. 2A illustrates a perspective view of a main shaft bearing compartment seal system, in accordance with various embodiments.

With reference to FIG. 2A a seal assembly 100 is illustrated, according to various embodiments. Seal assembly 100 may be an annular, static structure disposed in a main bearing shaft compartment 300 of engine 20 (FIG. 1). Stated another way, seal assembly 100 may be a non-rotating structure disposed around inner shaft 40 or outer shaft 50 of engine 20. As described in further detail below, seal assembly 100 may be configured to provide a sealing interface with rotating equipment in the main bearing shaft compartment 300. For instance, a fluid-tight seal may be created to limit fluid (e.g. air) leakage in and out the main bearing shaft compartment 300.

Seal assembly 100 may include a seal support 116, a seal housing 104 coupled to seal support 116, and a seal 102 coupled to seal housing 104. In various embodiments, seal 102 may comprise a carbon seal, for example, seal 102 may comprise graphite or electro-graphite. Seal support 116, seal housing 104, and seal 102 may each be annular structures disposed about engine central longitudinal axis A-A'.

Figure 2B:
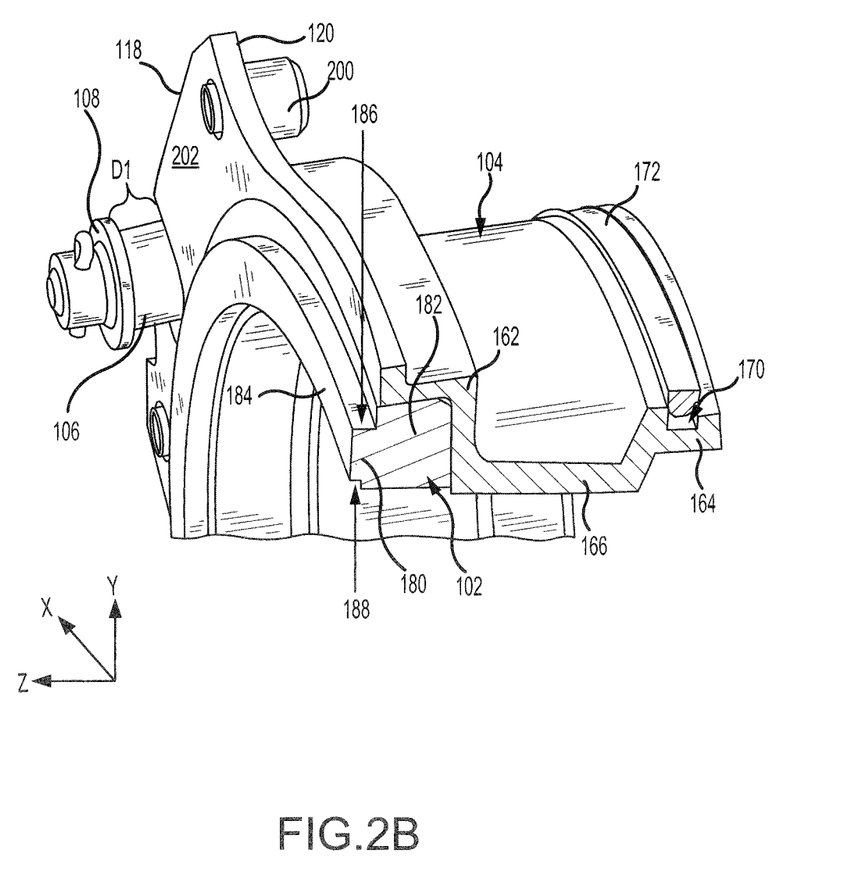
FIG. 2B illustrates a perspective cut-away view of components of a main shaft bearing compartment seal system, in accordance with various embodiments.

Referring to FIG. 2B, a cross-sectional view of seal housing 104 is illustrated, according to various embodiments. Seal housing 104 may be formed from a metallic material, for example, aluminum, titanium, nickel, steel, and alloys including any of the preceding metals. Seal housing 104 may include an aft portion 162, a forward portion 164, and a central portion 166 extending between aft portion 162 and forward portion 164. Forward portion 164 may define a groove 170. A piston ring 172 may be disposed in groove 170. In various embodiments, piston ring 172 may be made of a metallic material, such as cast iron or steel. In various embodiments, piston ring 172 may be made from a non-metallic material such as carbon graphite, carbon composite, or other suitable material. With momentary reference to FIG. 3A, piston ring 172 may contact seal support 116. In this regard, piston ring 172 may create a sealing interface with seal support 116 to reduce fluid leakage between seal housing 104 and seal support 116.

Returning to FIG. 2B aft portion 162 of seal housing 104 may support seal 102. Seal 102 may be coupled to seal housing 104 by compressive forces applied to seal 102 by aft portion 162. For example, seal 102 may be attached to seal housing 104 by heating seal housing 104, causing of aft portion 162 to expand. While in the expanded (i.e., heated) state, seal 102 may be pressed against aft portion 162. Aft portion 162 may then be cooled, causing a contraction of aft portion 162. As aft portion 162 contracts, seal 102 may be compressed between the surfaces of aft portion 162. The interference generated between seal 102 and aft portion 162 may hold seal 102 in place and may also place seal 102 in a compressed state. Attaching seal 102 in a compressed state may increase a strength and/or durability of seal 102.

Seal 102 may comprise a nose 180 and a main body 182. Nose 180 of seal 102 may extend aft from main body 182. Nose 180 may be defined, at least partially, by an axial surface 184 of seal 102, a distal radial surface 186 of seal 102, and proximal radial surface 188 of seal 102. Distal radial surface 186 may be radially outward of proximal radial surface 188. With momentary reference to FIG. 3A, distal radial surface 186 may comprise a length L1 extending axially from axial surface 184 to a distal axial surface 190 of main body 182. Proximal radial surface 188 may comprise a length L2 extending axially from axial surface 184 to a proximal axial surface 192 of main body 182. Length L1 of distal radial surface 186 may be greater than length L2 of proximal radial surface 188. In various embodiments, length L1 may be between 0.100 inches and 0.300 inches (i.e., between 0.254 cm and 0.762 cm), and length L2 may be between 0.030 inches and 0.150 inches (i.e., between 0.076 cm and 0.381 cm). In various embodiments, length L1 may be between 0.100 inches and 0.200 inches (i.e., between 0.254 cm and 0.508 cm), and length L2 may be between 0.030 inches and 0.080 inches (i.e., between 0.076 cm and 0.203 cm). In various embodiments, length L1 may be between 0.130 inches and 0.150 inches (i.e., between 0.330 cm and 0.381 cm), and length L2 may be between 0.040 inches and 0.060 inches (i.e., between 0.102 cm and 0.152 cm). In various embodiments, a ratio of length L1 to length L2 may be between 1.5:1 and 5:1. In various embodiments, a ratio of length L1 to length L2 may be between 2:1 and 3:1.

With combined reference to FIGS. 2A and 2B, seal housing 104 may include a plurality of flanges 118. Flanges 118 may extend radially outward from aft portion 162 of seal housing 104. Flanges 118 may be formed at varying locations along the circumference of aft portion 162. Flanges 118 may support a plurality of spring guides 200. Stated another way, spring guides 200 may be attached to and extend from flanges 118.

Seal assembly 100 may include a plurality of springs 140. Springs 140 may extend between seal support 116 and flanges 118 of seal housing 104. In various embodiments, springs 140 may be coil springs compressed between seal support 116 and flanges 118. Springs 140 may apply a force or spring load against a surface 120 of flange 118 to bias seal housing 104 and seal 102 in an aft direction (i.e., in the positive z-direction). With momentary reference to FIG. 3B, an aft portion of springs 140 may be disposed around spring guides 200. Spring guides 200 may support springs 140 and keep springs 140 aligned between seal support 116 and flanges 118. A forward portion of springs 140 may be located in a cavity 128 defined by seal support 116.

Returning to FIGS. 2A and 2B, seal assembly 100 may include a plurality of fasteners 106. Fasteners 106 may include pins, rivets, screws, bolts, or other suitable securement mechanisms. Fasteners 106 may extend through openings or apertures 130 formed through flanges 118 of seal housing 104. Stated another way, one or more flanges 118 of seal housing 104 may define apertures 130 through which fasteners 106 may be located. Fasteners 106 located through apertures 130 may aid in limiting rotation of seal housing 104. A cap 108 may be coupled to fasteners 106. Caps 108 may be coupled to fasteners on an aft side of flange 118. Stated another way, caps 108 may be located over a side of flange 118 that is opposite springs 140. Caps 108 may be located a distance D1 from apertures 130 and surface 202 of flange 118. Caps 108 may limit axial translation of seal housing 104 to distance D1. In that regard, upon seal housing 104 translating distance D1, surface 202 of flange may contact cap 10. With momentary reference to FIG. 3A, distance D1 may be selected to be less than length L1 of distal radial surface 186 and greater than length L2 of proximal radial surface 188. Configuring D1 to be less than length L1 and greater than length L2, may define a maximum distance springs 140 may lengthen. In other words, once surface 202 of flange 118 contacts cap 108, springs 140 may be prevented from continuing to lengthen.

Figure 3A:
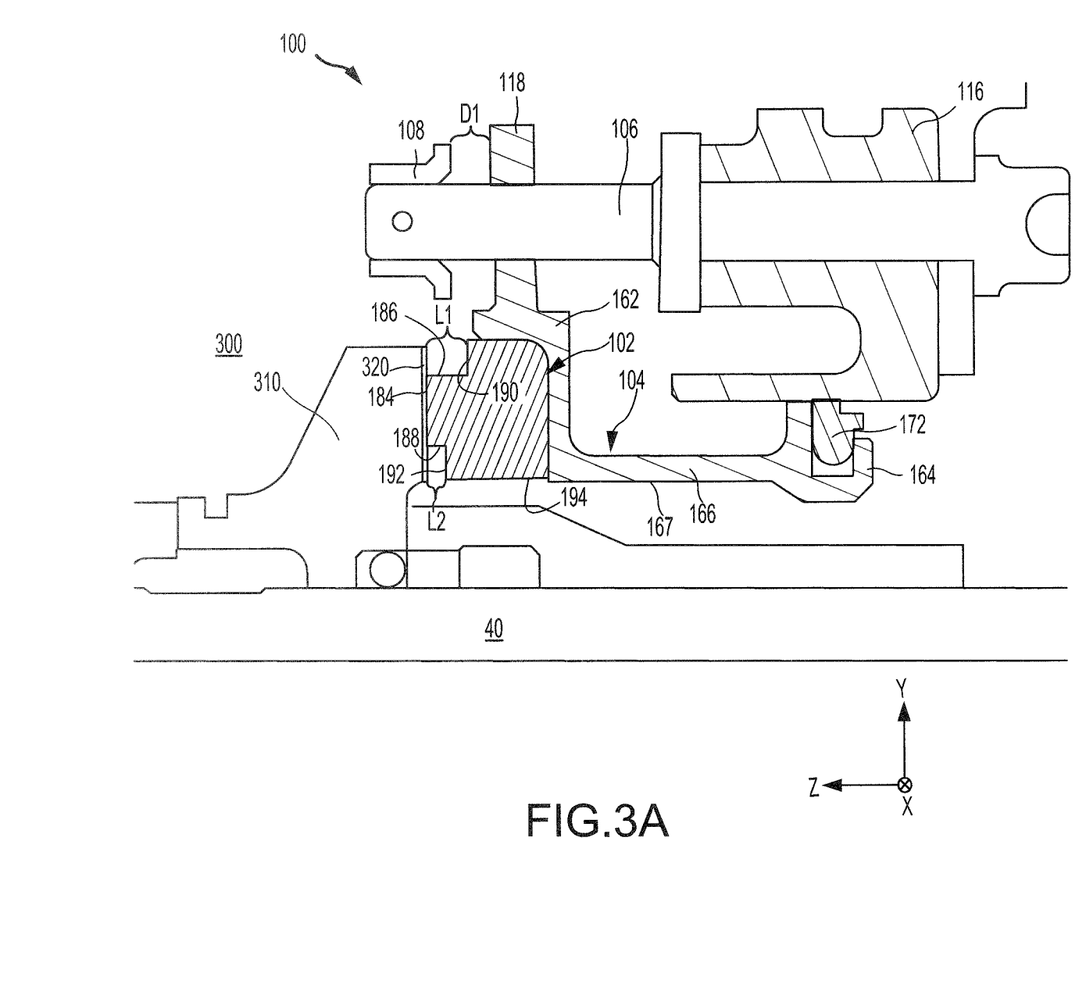
FIGS. 3A and 3B illustrate cross-sectional views of a main shaft bearing compartment seal system installed in a gas turbine engine, in accordance with various embodiments.
Figure 3B:
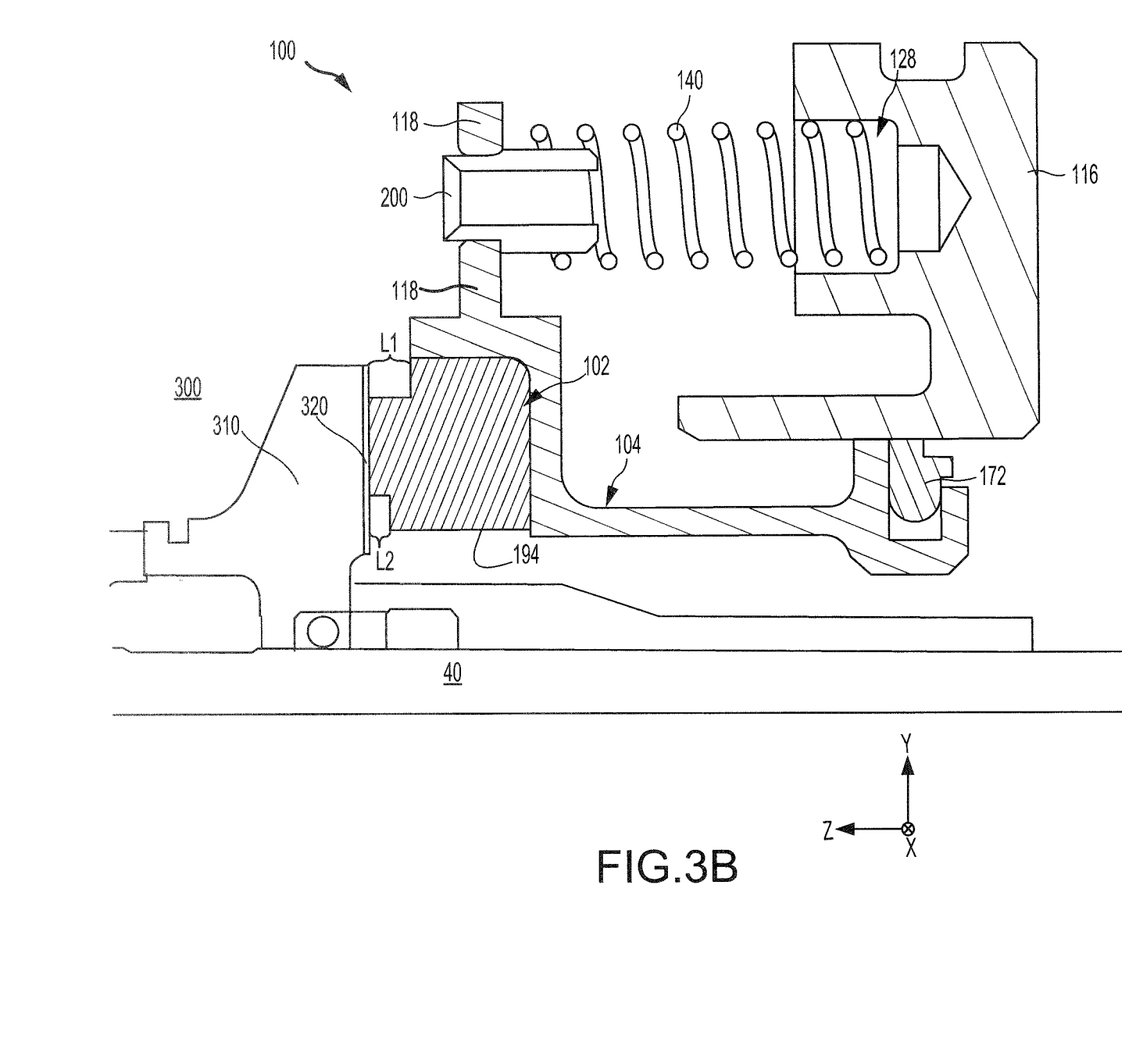

Referring to FIGS. 3A and 3B, partial cross-sectional views of seal assembly 100 disposed about inner shaft 40 are illustrated, according to various embodiments. Seal 102 may contact and form a fluid tight seal or "sealing interface" with a seal seat 310. In that regard, seal 102 may reduce air leakage into main bearing shaft compartment 300. Seal seat 310 may be mounted to shaft 40 for rotation about engine central longitudinal axis A-A' (FIG. 1).

As seal seat 310 rotates, the interface between static seal 102 and seal seat 310 may cause seal 102 to wear. A hard coat 320 may be disposed on seal seat 310. In various embodiments, hard coat 320 may comprise a coating comprising chromium, chromium-based alloy, or other metallic or suitable anti-wear coating material. Upon deposition, hard coat 320 may become integral with the surface of seal seat 310 that interfaces with seal 102. Hard coat 320 may reduce a wearing seal seat 310, such that friction between seal 102 and seal seat 310 will result in wear to seal 102 rather than to seal seat 310. Hard coat may reduce an occurrence of groove formation in seal seat 310. Hard coat 320 may extend radially inward beyond axial surface 184 of seal 102. In this regard, hard coat 320 is applied along the surface of seal seat 310 such that as the nose of seal 102 wears down, proximal axial surface 192 of seal 102 may contact hard coat 320.

As seal 102 wears, lengths L1 and L2 may decrease. Additionally, as seal 102 wears, seal housing 104 and seal 102 may translate aft (i.e., toward seal seat 310) due to the axial force applied by springs 140 against flanges 118. As seal housing 104 translates toward seal seat 310, springs 140 may lengthen (i.e., decompress). In various embodiments, seal 102 may be configured such that inner diameter surface 194 of seal 102 may be radially outward of the inner surface 167 of central portion 166 of sealing housing 104. Increasing an inner diameter of seal 102 such that inner diameter surface 194 is radially outward of surface 167 may protect seal 102 from handling damage.

During operation of engine 20 (FIG. 1), a pressure outside main bearing shaft compartment 300 may be greater than the pressure inside main bearing shaft compartment 300. Stated another way, a pressure of the area located forward the interface between seal seat 310 and seal 102 may be greater than the pressure of the area located aft of the interface between seal seat 310 and seal 102. The pressure differential between the area inside main bearing shaft compartment 300 and area outside main bearing shaft compartment 300 tends to force seal 102 toward seal seat 310. During high power operating condition (e.g. take-off), the pressure differential may be increased as compared to low power operating condition (e.g., cruise or idle). During high power operating condition, less spring load may be associated with maintaining the sealing interface between seal 102 and seal seat 310. During low power operating condition a greater spring load may be required to maintain the sealing interface between seal 102 and seal seat 310.

Configuring length L2 of seal 102 to be less than length L1 may allow seal 102 to employ air load caused by the pressure differential to achieve an increased axial force. For example, an increased axial force air load may be applied to seal 102 when proximal radial surface 188 is fully worn (i.e., when proximal axial surface 192 of seal 102 contacts seal seat 310). The additional axial air load may counter loss of spring load caused by axial translation of seal housing 104 and springs 140 lengthening. The additional axial air load provided by the geometry of seal 102 may allow for springs 140 having a reduced spring load to be employed in seal assembly 100. Reducing the spring load tends to reduce a size and/or weight of springs 140. Distance D1 may be selected to be between the first and second axial cuts within the carbon ring. Configuring distance D1 to be greater than LI and less than L2 may prevent the seal from operating with reduced loads and exposure to dynamic instabilities. The geometry of seal 102 may avoid disengagement of seal 102 from seal seat 310, which may lead to improved function and overall performance of seal assembly 100 and the gas turbine engine.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A carbon seal assembly, comprising:
a seal support;
a seal housing coupled to the seal support, the seal housing comprising an aft portion, a forward portion, and a central portion extending axially between the aft portion and the forward portion;
a carbon seal coupled to the aft portion of the seal housing, the carbon seal comprising a nose defined, at least partially, by an axial surface of the carbon seal, a first radial surface of the carbon seal, and a second radial surface of the carbon seal radially inward of the first radial surface, wherein the first radial surface and the second radial surface extend forward from the axial surface, and wherein a first axial length of the first radial surface is greater than a second axial length of the second radial surface, and wherein an inner diameter surface of the carbon seal is radially outward of an inner surface of the central portion of the seal housing, the inner surface of the central portion being oriented in a radially inward direction, and wherein the inner diameter surface of the carbon seal is entirely free from overlap with the seal housing in a radially inward direction.

2. The carbon seal assembly of claim 1, further comprising a fastener extending through an aperture defined by a flange extending radially outward from the seal housing.

3. The carbon seal assembly of claim 2, wherein a distance between the flange and a cap of the fastener is less than the first axial length and greater than the second axial length.

4. The carbon seal assembly of claim 3, wherein the cap of the fastener limits an axial translation of the seal housing.

5. The carbon seal assembly of claim 1, further comprising a piston ring disposed in a groove defined by the forward portion of the seal housing.

6. A main shaft bearing compartment seal system of a gas turbine engine, comprising:
a shaft;
a seal seat coupled to the shaft; and
a carbon seal assembly disposed radially outward of the shaft, the carbon seal assembly comprising:
a seal support;
a seal housing coupled to the seal support, the seal housing comprising an aft portion, a forward portion, and a central portion extending axially between the aft portion and the forward portion; and
a carbon seal attached to the seal housing, the carbon seal comprising a nose defined, at least partially, by an axial surface of the carbon seal, a first radial surface of the carbon seal, and a second radial surface of the carbon seal radially inward of the first radial surface, wherein the first radial surface and the second radial surface extend from the axial surface, and wherein a first length of the first radial surface is greater than a second length of the second radial surface, and wherein an inner diameter surface of the carbon seal is radially outward of an inner surface of the central portion of the seal housing, the inner surface of the central portion being oriented in a radially inward direction, and wherein the inner diameter surface of the carbon seal is entirely free from overlap with the seal housing in a radially inward direction;
a fastener extending through an aperture defined by a flange extending radially outward from the seal housing; and
a cap coupled to the fastener, wherein a distance between the cap and the flange is less than the first length and greater than the second length.

7. The main shaft bearing compartment seal system of claim 6, wherein the cap is located aft of the flange.

8. The main shaft bearing compartment seal system of claim 6, wherein the carbon seal assembly further comprises a spring extending between the seal support and the flange of the seal housing, and wherein a portion of the spring is located in a cavity defined by the seal support.

9. The main shaft bearing compartment seal system of claim 7, wherein the cap limits an axial translation of the seal housing.

10. The main shaft bearing compartment seal system of claim 6, wherein the seal seat rotates about an axis of the gas turbine engine, and wherein the seal housing prevents the carbon seal from rotating about the axis of the gas turbine engine.

11. The main shaft bearing compartment seal system of claim 6, further comprising a hard coat disposed on a surface of the seal seat.

12. The main shaft bearing compartment seal system of claim 11, wherein the hard coat extends radially inward beyond the second radial surface of the carbon seal.

13. The main shaft bearing compartment seal system of claim 6, further comprising a piston ring disposed in a groove defined by the seal housing.

14. A seal assembly, comprising:
a seal housing comprising an aft portion, a forward portion, and a central portion extending axially between the aft portion and the forward portion; and
a seal attached to the seal housing, the seal comprising a nose defined by a first surface of the seal, a second surface of the seal, and a third surface of the seal, wherein the second surface and the third surface extend from the first surface, and wherein a first length of the second surface is greater than a second length of the third surface, and wherein a diameter of the seal as measured at an inner diameter surface of the seal is greater than a diameter of the seal housing as measured at an inner surface of the central portion of the seal housing, the inner surface of the central portion being oriented in a radially inward direction, and wherein the inner diameter surface of the seal is entirely free from overlap with the seal housing in a radially inward direction.

15. The seal assembly of claim 14, further comprising:
a fastener extending through an aperture defined by the seal housing; and
a cap coupled to the fastener, wherein a second distance between the cap and the aperture is less than the first length and greater than the second length.

16. The seal assembly of claim 14, further comprising a piston ring disposed in a groove defined by the seal housing.

17. The seal assembly of claim 14, further comprising:
a seal support coupled to the seal housing; and
a spring extending between the seal support and a flange extending radially outward from the seal housing, wherein a portion of the spring is located in a cavity defined by the seal support.

18. The carbon seal assembly of claim 1, further comprising a spring extending between the seal support and a flange extending radially from the seal housing, wherein a portion of the spring is located in a cavity defined by the seal support.

19. The main shaft bearing compartment seal system of claim 8, wherein the spring biases the seal housing and the carbon seal toward the seal seat.

* * * * *